April 30, 1940.  S. H. CALDWELL  2,198,902
SPEED WARNING DEVICE
Filed Aug. 9, 1937

INVENTOR
STUART H. CALDWELL
BY
ATTORNEYS

Patented Apr. 30, 1940

2,198,902

UNITED STATES PATENT OFFICE 2,198,902

SPEED WARNING DEVICE

Stuart H. Caldwell, Detroit, Mich., assignor to Kelch Heater Company, Detroit, Mich., a corporation of Michigan Application August 9, 1937, Serial No. 158,208

4 Claims. (Cl. 200—56)

This invention relates to motor vehicles and refers more particularly to improvements in safety devices for motor vehicles.

One of the principal objects of this invention is to provide signalling means adapted to be readily installed on motor vehicles and effective when the vehicle attains a pre-selected speed to impart a signal to the operator to inform him that the selected speed is being exceeded.

Another important object of the invention is to provide electrical means associated with means responsive to the speed of the vehicle to actuate a speed warning device when a pre-determined speed is reached, yet which will not materially interfere with the normal and proper operation of the speed responsive means.

An advantageous feature of the invention resides in the provision of a safety device of the character set forth which signals the operator when the selected speed is reached but which does not prevent acceleration of the vehicle beyond that speed should such operation be necessary to provide safety in certain emergencies.

In addition to the foregoing, the invention contemplates simple electrical actuating means adapted to operate a signalling device in dependence upon the speed of the vehicle and supplied with power from the ignition system of the vehicle.

A still further object of the invention is to provide a speed warning device having means readily accessible for adjustment by the operator to select the speed at which he desires the signal to be given in accordance with the safe or legal limit of speed in the particular locality where the vehicle is being operated.

In the past speed warning devices have been electrically operated by means of contact points associated with the speedometer of the vehicle and arranged to contact each other when the pre-determined speed is reached to close the circuit to the control means. This system, however, is subject to the inherent disadvantage that the frictional and electrical engagement between the contact points impairs the efficiency and accuracy of the speedometer. It is accordingly one of the objects of the present invention to provide a speedometer having circuit closing means adapted to actuate a speed warning device without interfering with the proper operation of the speedometer.

The above, as well as other objects and advantages, will be more apparent as this description proceeds, especially when considered in connection with the accompanying drawing, wherein.

Figure 1:
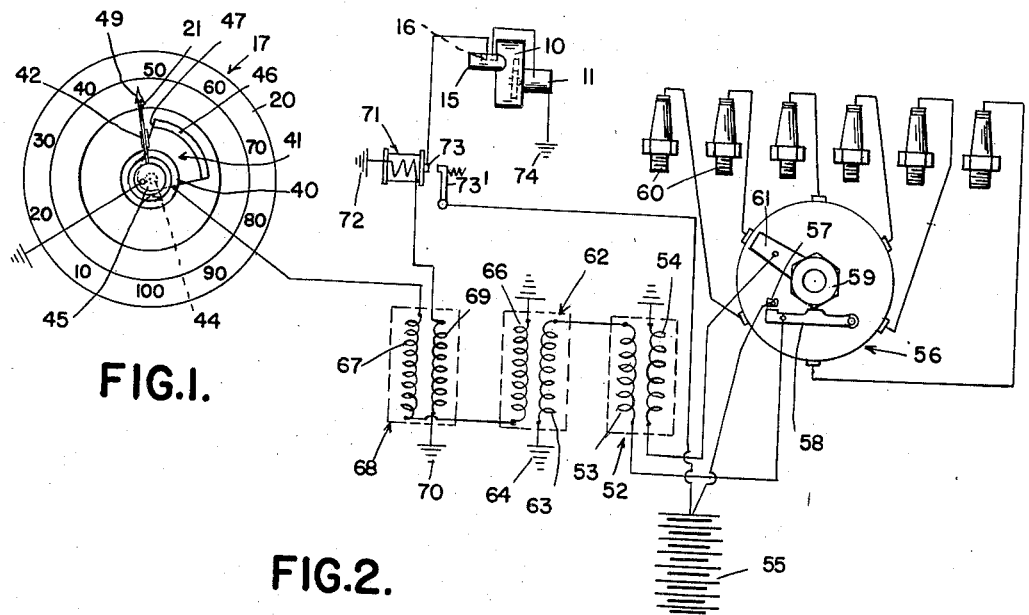
Figure 1 is a diagrammatic view illustrating the means for actuating the signal.

In accordance with this invention, a signal is imparted to the operator of a motor vehicle when the latter reaches, or exceeds a pre-selected speed. Although I have herein illustrated my invention as adapted to operate a small blower to direct a current of air against the operator, it will be understood that various signalling devices may be actuated by my control means to attract the attention of the driver when he attains an excessive speed. For example, my device is applicable to ring a bell, light a light, operate a vibrator attached to the steering wheel or to the accelerator pedal, or to signal the driver by other tactual, visible or audible means.

In the embodiment of the invention selected herein for the purpose of illustration, the signal comprises a small blower 10 driven by an electric motor 11 and mounted upon the floorboards 12 of the vehicle body adjacent the accelerator 13, the latter being operatively connected to the throttle 14 of the motor to control the speed of the vehicle. The blower 10 has a discharge outlet 15 arranged to direct air against the operator's ankle and is provided with a heating unit 16 for heating the discharged air so that its effect will be more noticeable to the operator.

The operation of the blower 10 is controlled by a speedometer 17 of the magnetic type supported within the casing 19 and mounted upon the instrument panel 18 of the vehicle body. Briefly, the speedometer consists of a magnet 26 driven by the usual speedometer cable 27 and rotatably supported within the inverted cup-shaped rotor 28. The rotor 28 is balanced in a bearing on the end of the magnet in axial alignment with the drive shaft 27 and is provided with a forwardly extending shaft portion 29 connected adjacent the outer end with the hairspring 30 in the usual manner. The extreme forward end of the shaft 29 is operatively connected by means of gearing 25 to a hollow shaft 22 journalled in the front wall 23 of the casing. A balanced speed indicating needle 21 is secured to the forward end of the hollow shaft 22 and is adapted to be rotated across the dial 20 mounted upon the forward end of the speedometer casing 19.

Figure 2:
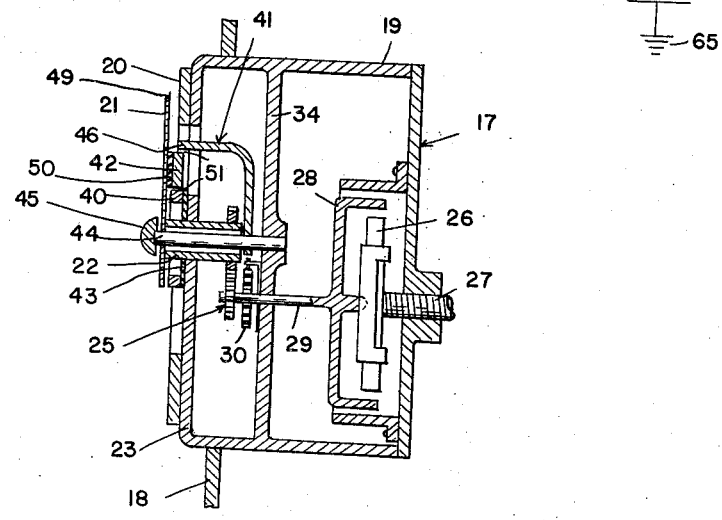
Figure 2 is an enlarged sectional view of the signal control apparatus.
Figure 3:
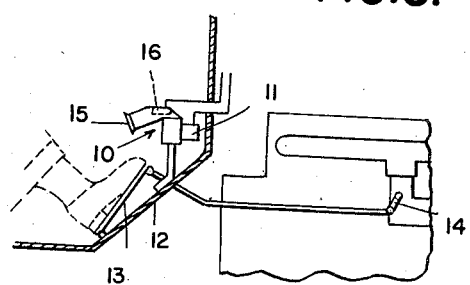
Figure 3 is a diagram showing the signal.

Speedometer units constructed in accordance with the foregoing are extremely sensitive, and the accuracy of the same is seriously affected in the event an attempt is made to place any additional load on the driving parts. In order to preserve the accuracy of the speedometer, I utilize an electric circuit including a jump-gap switch arranged to be closed by the speedometer 17 when the preselected speed is exceeded to operate the motor 11 of the blower 10. Briefly, the circuit closing means comprises a fixed annular ring 40, an adjustable segment 41, and a contact bar 42 carried by the needle 21 and arranged to complete the circuit from the ring to the segment. The annular ring 40 is secured to the forward wall 23 of the speedometer, concentric with the axis of the needle 21, and is electrically insulated therefrom by means of a suitable dielectric material 43. The adjustable annular segment 41 is secured to a shaft 44 having its inner end journalled in the partition 34 of the casing. The forward end of the shaft 44 extends through the hollow shaft 22, concentric with the latter, and is provided with a knob 45 at its outer end for manipulation by the operator. The segment 41 has a forwardly projecting portion 46 arranged substantially radially of the ring 40 and extending through an arcuate slot in the front wall of the casing as shown in Fig. 2. Inasmuch as the portion 46 of the segment 41 is visible from the front of the speedometer, the former may be readily adjusted by simply turning the knob 45 until the leading edge 47 of the segment is in radial alignment with the desired reading on the dial 20.

The contact bar 42 is secured to the rear side of the needle 21 intermediate its pivotal connection to the shaft 22 and the pointer 49 at its outer extremity, and is suitably insulated from the needle at 50. As best shown in Fig. 2, in its operative position the contact bar 42 does not actually contact the ring 40 or the portion 46 of the segment 41, but is separated from the ring and the segment by the air gaps 51. As hereinafter described more in detail, the utilization of a high potential source of electrical current enables the current to jump the small air gaps 51 when the contact bar 42 is in radial alignment with the adjustable segment 41. Inasmuch as there is no frictional engagement between the contact bar 42 and the ring 40 or the segment 41, it necessarily follows that the operation of the speed warning device does not affect the proper operation of the speedometer as a speed indicating mechanism and does not impair its accuracy.

The electrical circuit employed in one embodiment of the invention is diagrammatically shown in Fig. 1. The circuit includes the conventional ignition system of the motor vehicle, illustrated herein as being of the jump spark type in which a high tension current is produced in the secondary circuit of an ignition coil by breaking the primary circuit at timed intervals. In detail, the ignition system includes the usual ignition coil 52 having a primary winding 53 and a secondary winding 54. Current is supplied to the primary winding 53 by means of the battery 55. The primary circuit is periodically broken by the circuit breaker 56 which is of conventional construction and includes the breaker point 57, breaker arm 58, and cam 59. The cam 59 is rotated in timed relation to the power plant of the vehicle and periodically moves the breaker arm 58 away from the breaker point 57 to break the primary circuit and induce an intermittent current of high intensity in the secondary winding 54. This high intensity current produces a jump spark across the electrodes of the spark plugs 60 in the usual manner by means of the distributor 61.

In addition to the foregoing elements of the conventional ignition system, an additional induction coil 62, similar to the ignition coil 52, is provided. The primary winding 63 of the coil 62 is connected to the primary winding 53 of the coil 52. The other terminal of the primary winding 63 is grounded to the vehicle frame at 64, and since the battery 55 is also grounded at 65, a current is passed through the primary windings 53 and 63 in dependence upon the operation of the circuit breaker 56. The secondary winding 66 of the induction coil 62 is connected to the primary winding 67 of a high tension transformer 68 which in turn is connected to the ring 40 on the speedometer casing. The other terminal of the secondary winding 66 is grounded, as also is the adjustable segment 41 of the speedometer. Due to the electromagnetic coupling between the primary and secondary windings on the coil 62, a high potential is induced in the secondary winding 66. This potential is high enough to cause an electrical current to jump the air gaps 51 between the bar 42 and the segment 41 when the needle reaches a position corresponding to the pre-adjusted position of the segment. Thus current flows through the primary winding 67 of the transformer 68 only when the pre-selected speed of the vehicle is attained.

The secondary winding 69 on the transformer 68 has one terminal grounded at 70 and the other connected to a relay 71 which is grounded as at 72. The transformer 68 is of the step-down type and functions to step down the high voltage applied to the primary winding 67 to apply a low voltage and a high intensity current to the relay 71. The relay, when energized, closes the contact points 73 and 73' and connects the motor 11 of the blower 10 to the battery 55. In this connection it should be noted that current to the motor 11 is first passed through the heating unit 16 in the discharge outlet 15 of the blower to heat the air directed against the operator's ankle. The other terminal of the motor 11 is grounded at 74.

With reference now to the operation of the speed warning device previously described, and assuming that the operator desires to be informed when the speed of the vehicle exceeds 50 miles per hour, the segment 41 is adjusted by the knob 45 to a position wherein the leading edge 47 of the segment registers with the numeral 50 on the dial 20 of the speedometer. Inasmuch as the contact bar 42 is carried by the speed indicating needle 21, it follows that when the needle registers with the numeral 50, the contact bar 42 is in radial alignment with the portion 46 of the segment 41 and spaced therefrom by the air gap 51. The contact bar is also similarly spaced from the ring 40. The high potential induced in the secondary winding 66 of the induction coil 62 enables the current to jump the gaps 51 and energize the primary winding 67 of the transformer 68. This in turn induces a potential in the secondary winding 69 and consequently energizes the relay 71, closing the contact points 73 and 73'. This closes the circuit to the blower 10 and causes air heated by the unit 16 to be directed against the ankle of the operator. As shown in Fig. 1 the segment 41 covers a sector of the speedometer dial and enables the signal to the operator to be continued beyond the pre-selected speed.

From the foregoing it will be observed that I have provided a simple speed warning device operated by the speedometer in such a manner that no additional load is placed upon the driving parts of the speedometer. Thus there is no interference with the operation or accuracy of the speedometer in indicating the speed of the vehicle.

What I claim as my invention is:

1. In a device of the class described, a rotatable indicating element, an annular contact member concentric with the axis of the rotatable element, a contact segment pivotally adjustable about the axis of the rotatable element, a contact member carried by said rotatable element and movable therewith as a unit into registration with the annular contact member and the contact segment, the contact member carried by the rotatable element being of such a size that it is spaced from the annular contact member and the contact segment when in registration to provide air gaps therebetween.

2. Indicating circuit control means comprising a graduated scale, an indicator movable relative to said scale, a conductor movable relative to said scale and adapted to be set to a position corresponding to some value of said scale, a second conductor carried by said indicator and adapted to move close to but out of contact with said first conductor, whereby a circuit may be closed across the gap between said conductors when said indicator indicates said value on said scale.

3. A casing having a scale on one wall thereof, said wall having an aperture, and an arcuate slot therethrough, a tubular spindle extending through said aperture, an indicator carried by said spindle and movable therewith over said slot and relative to said scale, a shaft in said spindle, and extending beyond both ends thereof, a knob on the outer end of said shaft, a contact member secured to the other end of said shaft inside said casing and projecting outwardly through said arcuate slot, and a second contact carried by said indicator and adapted to move into cooperative relation with said first contact.

4. In combination, a dial, a pointer pivoted centrally of said dial to move over said dial, an annular contact carried by said dial around the pivot point of said pointer, an arcuate slot through said dial and concentric with said annular contact, an adjustable contact movable in said slot, and a contact carried by said pointer and adapted to cooperate with said first-mentioned contacts.

STUART H. CALDWELL.